United States Patent
Rasane et al.

(10) Patent No.: US 9,342,928 B2
(45) Date of Patent: May 17, 2016

(54) SYSTEMS AND METHODS FOR PRESENTING BUILDING INFORMATION

(75) Inventors: Shailesh Rasane, Paramatta (AU); Ben Coleman, Sydney (AU); Rajesh Sankarapandia, Madurai (IN); Kirupakar Janakiraman, Madurai (IN); Parthasarathy Chinnachamy, Madurai (IN); Naga Sundar, Madurai (IN); Sarath Sasidharan, Pangappara (IN); Henry Chen, Beijing (CN); Xiaoli Wang, Beijing (CN); Conrad Bruce Beaulieu, Duluth, MN (US); Thirumal Raman, Coimbatore (IN); Sekar Mookan, Kanyakumari (IN); Venu Gadde, AndhraPradesh (IN)

(73) Assignee: Honeywell International Inc., Morris Plains, NJ (US)

( * ) Notice: Subject to any disclaimer, the term of this patent is extended or adjusted under 35 U.S.C. 154(b) by 267 days.

(21) Appl. No.: 13/538,677

(22) Filed: Jun. 29, 2012

(65) Prior Publication Data

US 2013/0169681 A1    Jul. 4, 2013

(30) Foreign Application Priority Data

Jun. 29, 2011 (AU) ............... 2011902571

(51) Int. Cl.
G09G 5/00 (2006.01)
G06T 19/00 (2011.01)
G06Q 10/06 (2012.01)
G06Q 50/10 (2012.01)

(52) U.S. Cl.
CPC ............ *G06T 19/006* (2013.01); *G06Q 10/06* (2013.01); *G06Q 50/10* (2013.01); *G05B 2219/2642* (2013.01)

(58) Field of Classification Search
None
See application file for complete search history.

(56) References Cited

U.S. PATENT DOCUMENTS

| | | | |
|---|---|---|---|
| 5,719,561 | A | 2/1998 | Gonzales |
| 5,745,126 | A | 4/1998 | Jain et al. |

(Continued)

FOREIGN PATENT DOCUMENTS

| | | |
|---|---|---|
| GB | 2441434 | 5/2008 |
| JP | 11024735 | 1/1999 |

(Continued)

OTHER PUBLICATIONS

"Incident Management IPT Requirements BAA for Topics Related to Geospatial Location Accountability and Navigation System for Emergency Responders (GLANSER)," Broad Agency Annoucement BAA09-02, pp. 1-34, Jan. 23, 2009.

(Continued)

*Primary Examiner* — James A Thompson
*Assistant Examiner* — Xilin Guo
(74) *Attorney, Agent, or Firm* — Seager, Tufte & Wickhem, LLP

(57) ABSTRACT

Described herein are systems and methods for presenting building information. In overview, the technologies described herein provide relationships between Building Information Modeling (BIM) data (which includes building schematics defined in terms of standardized three dimensional models) and Building Management System (BMS) data (which includes data indicative of the operation of building components such as HVAC components and the like). Some embodiments use relationships between these forms of data thereby to assist technicians in identifying the physical location of particular pieces of equipment, for example in the context of performing inspections and/or maintenance. In some cases this includes the provision of 2D and/or 3D maps to portable devices, these maps including the location of equipment defined both in BIM and BMS data. In some cases, augmented reality technology is applied thereby to provide richer access to positional information.

3 Claims, 10 Drawing Sheets

(56) References Cited

U.S. PATENT DOCUMENTS

| | | | |
|---|---|---|---|
| 5,857,986 A | 1/1999 | Moriyasu | |
| 6,006,161 A | 12/1999 | Katou | |
| 6,334,211 B1 | 12/2001 | Kojima et al. | |
| 6,710,706 B1 | 3/2004 | Withington et al. | |
| 6,720,921 B2 | 4/2004 | Ripingill, Jr. et al. | |
| 6,876,951 B2 | 4/2005 | Skidmore et al. | |
| 6,900,762 B2 | 5/2005 | Andrews et al. | |
| 6,924,787 B2 | 8/2005 | Kramer et al. | |
| 6,965,312 B2 | 11/2005 | Lerg | |
| 7,002,551 B2 | 2/2006 | Azuma et al. | |
| 7,062,722 B1 | 6/2006 | Carlin et al. | |
| 7,096,120 B2 | 8/2006 | Hull | |
| 7,102,510 B2 | 9/2006 | Boling et al. | |
| 7,111,783 B2 | 9/2006 | Xi et al. | |
| 7,132,928 B2 | 11/2006 | Perricone | |
| 7,139,685 B2 | 11/2006 | Bascle et al. | |
| 7,146,218 B2 | 12/2006 | Esteller et al. | |
| 7,164,972 B2 | 1/2007 | Imhof et al. | |
| 7,200,639 B1 | 4/2007 | Yoshida | |
| 7,246,008 B2 | 7/2007 | Daubert et al. | |
| 7,246,044 B2 | 7/2007 | Imamura et al. | |
| 7,292,908 B2 | 11/2007 | Borne et al. | |
| 7,301,648 B2 | 11/2007 | Foxlin | |
| 7,304,442 B2 | 12/2007 | Colwell | |
| 7,308,323 B2 | 12/2007 | Kruk et al. | |
| 7,342,648 B2 | 3/2008 | Solomon et al. | |
| 7,358,458 B2 | 4/2008 | Daniel | |
| 7,359,840 B2 | 4/2008 | Akasaka et al. | |
| 7,382,281 B2 | 6/2008 | Kavaler | |
| 7,383,148 B2 | 6/2008 | Ahmed | |
| 7,389,207 B2 | 6/2008 | Saitta | |
| 7,420,510 B2 | 9/2008 | Kolavennu et al. | |
| 7,496,445 B2 | 2/2009 | Mohsini et al. | |
| 7,512,450 B2 | 3/2009 | Ahmed | |
| 7,523,022 B2 | 4/2009 | Thomas et al. | |
| 7,545,263 B2 | 6/2009 | Plocher et al. | |
| 7,548,833 B2 | 6/2009 | Ahmed | |
| 7,567,844 B2 | 7/2009 | Thomas et al. | |
| 7,583,275 B2 | 9/2009 | Neumann et al. | |
| 7,596,473 B2 | 9/2009 | Hansen et al. | |
| 7,606,579 B2 | 10/2009 | Thacher | |
| 7,610,910 B2 | 11/2009 | Ahmed | |
| 7,612,832 B2 | 11/2009 | Zhang et al. | |
| 7,664,574 B2 | 2/2010 | Imhof et al. | |
| 7,683,793 B2 | 3/2010 | Li et al. | |
| 7,715,980 B2 | 5/2010 | Bargeron et al. | |
| 7,733,836 B2 | 6/2010 | Huseth | |
| 7,764,220 B1 | 7/2010 | Samaniego | |
| 7,774,075 B2 | 8/2010 | Lin | |
| 7,777,666 B2 | 8/2010 | Gregory et al. | |
| 7,830,250 B2 | 11/2010 | Huseth et al. | |
| 7,898,468 B2 | 3/2011 | Samaniego et al. | |
| 7,962,150 B2 | 6/2011 | Hertzog et al. | |
| 7,973,669 B2 | 7/2011 | Pham et al. | |
| 7,982,614 B2 | 7/2011 | Holm et al. | |
| 8,000,892 B2 | 8/2011 | Banerjee | |
| 8,040,273 B2 | 10/2011 | Tomich et al. | |
| 8,041,744 B2 | 10/2011 | Heikkonen et al. | |
| 8,089,407 B2 | 1/2012 | Chen et al. | |
| 8,102,423 B2 | 1/2012 | Cheng | |
| 8,279,119 B2 | 10/2012 | Elwell, Jr. et al. | |
| 8,289,390 B2 | 10/2012 | Aggarwal et al. | |
| 8,306,748 B2 | 11/2012 | Huseth et al. | |
| 8,352,218 B2 | 1/2013 | Balla et al. | |
| 8,427,473 B2 * | 4/2013 | Elsberg et al. | 345/420 |
| 2002/0055384 A1 | 5/2002 | Armstrong | |
| 2003/0083957 A1 | 5/2003 | Olefson | |
| 2003/0214400 A1 | 11/2003 | Mizutani et al. | |
| 2004/0021569 A1 | 2/2004 | Lepkofker et al. | |
| 2004/0233192 A1 | 11/2004 | Hopper | |
| 2005/0010460 A1 | 1/2005 | Mizoguchi et al. | |
| 2005/0222889 A1 * | 10/2005 | Lai et al. | 705/9 |
| 2005/0264558 A1 | 12/2005 | Vesely et al. | |
| 2005/0267900 A1 | 12/2005 | Ahmed et al. | |
| 2006/0009862 A1 | 1/2006 | Imhof et al. | |
| 2006/0029256 A1 | 2/2006 | Miyoshi et al. | |
| 2006/0044307 A1 | 3/2006 | Song | |
| 2006/0061752 A1 | 3/2006 | Solomon et al. | |
| 2006/0073455 A1 | 4/2006 | Buyl et al. | |
| 2006/0265664 A1 | 11/2006 | Simons et al. | |
| 2007/0001904 A1 | 1/2007 | Mendelson | |
| 2007/0201421 A1 | 8/2007 | Huseth | |
| 2007/0205886 A1 | 9/2007 | Huseth et al. | |
| 2007/0239350 A1 | 10/2007 | Zumsteg et al. | |
| 2007/0239352 A1 | 10/2007 | Thota et al. | |
| 2007/0279210 A1 | 12/2007 | Li et al. | |
| 2008/0033645 A1 | 2/2008 | Levinson et al. | |
| 2008/0040669 A1 | 2/2008 | Plocher et al. | |
| 2008/0062167 A1 | 3/2008 | Boggs et al. | |
| 2008/0068267 A1 | 3/2008 | Huseth et al. | |
| 2008/0077326 A1 | 3/2008 | Funk et al. | |
| 2008/0122696 A1 | 5/2008 | Huseth et al. | |
| 2008/0158256 A1 | 7/2008 | Rusell et al. | |
| 2008/0215524 A1 | 9/2008 | Fuchs et al. | |
| 2008/0220780 A1 | 9/2008 | Huseth et al. | |
| 2008/0228039 A1 | 9/2008 | Huseth et al. | |
| 2008/0270172 A1 * | 10/2008 | Luff et al. | 705/1 |
| 2009/0040175 A1 | 2/2009 | Xu et al. | |
| 2009/0043504 A1 | 2/2009 | Bandyopadhyay et al. | |
| 2009/0044808 A1 | 2/2009 | Guney et al. | |
| 2009/0046140 A1 | 2/2009 | Lashmet et al. | |
| 2009/0105006 A1 | 4/2009 | Doyle | |
| 2009/0216438 A1 | 8/2009 | Shafer | |
| 2009/0216775 A1 | 8/2009 | Ratliff et al. | |
| 2009/0238417 A1 * | 9/2009 | Nielsen et al. | 382/113 |
| 2009/0265104 A1 | 10/2009 | Shroff | |
| 2009/0298024 A1 | 12/2009 | Batzler et al. | |
| 2009/0307255 A1 | 12/2009 | Park | |
| 2010/0057354 A1 | 3/2010 | Chen et al. | |
| 2010/0114383 A1 * | 5/2010 | Rosca et al. | 700/276 |
| 2010/0121567 A1 | 5/2010 | Mendelson | |
| 2010/0299065 A1 | 11/2010 | Mays | |
| 2011/0059698 A1 | 3/2011 | Huseth et al. | |
| 2011/0082643 A1 | 4/2011 | Huseth et al. | |
| 2011/0112875 A1 | 5/2011 | Johnson et al. | |
| 2011/0115816 A1 * | 5/2011 | Brackney | 345/629 |
| 2011/0137549 A1 | 6/2011 | Gupta et al. | |
| 2011/0153279 A1 | 6/2011 | Zhang et al. | |
| 2011/0164768 A1 | 7/2011 | Huseth et al. | |
| 2011/0248847 A1 | 10/2011 | Huseth et al. | |
| 2011/0268300 A1 | 11/2011 | DeMers et al. | |
| 2011/0270584 A1 | 11/2011 | Plocher et al. | |
| 2011/0270654 A1 | 11/2011 | Banerjee et al. | |
| 2011/0276264 A1 | 11/2011 | Plocher et al. | |
| 2011/0285851 A1 | 11/2011 | Plocher et al. | |
| 2012/0130632 A1 | 5/2012 | Bandyopadhyay et al. | |
| 2012/0143495 A1 | 6/2012 | Dantu | |
| 2012/0169530 A1 | 7/2012 | Padmanabhan et al. | |
| 2012/0173204 A1 | 7/2012 | Padmanabhan | |
| 2012/0194517 A1 | 8/2012 | Izadi et al. | |
| 2012/0319903 A1 | 12/2012 | Huseth et al. | |

FOREIGN PATENT DOCUMENTS

| | | |
|---|---|---|
| JP | 11317936 | 11/1999 |
| JP | 2001356813 | 12/2001 |
| JP | 2005242531 | 9/2005 |
| JP | 2005311563 | 11/2005 |
| JP | 2007183432 | 7/2007 |
| JP | 2007333998 | 12/2007 |
| WO | WO 92/10953 | 7/1992 |
| WO | WO 2005/033912 | 4/2005 |
| WO | WO 2005/040989 | 5/2005 |
| WO | WO 2009/029834 | 3/2009 |
| WO | WO 2009/071919 | 6/2009 |
| WO | WO 2010/107379 | 9/2010 |

OTHER PUBLICATIONS

Baronski, "New Sensor Signal Processor Paradigms: When One Pass Isn't Enough," HPEC, 19 pages, 2008.

Budroni et al., "Automated 3D Reconstruction of Interiors from Point Clouds," International Journal of Architechtural Computing, vol. 8, Issue 1, pp. 55-74, Mar. 2010.

(56) References Cited

OTHER PUBLICATIONS

Cinaz et al., "HeadSLAM—Simultaneous Localization and Mapping with Head-Mounted Inertial and Laser Range Sensors," IEEE pp. 3-10, 2008.
Davison, "Real-Time Simultaneous Localisation and Mapping with a Single Camera," Proceedings of the Ninth IEEE International Conference on Computer Vision, pp. 1-8, 2003.
Fischer et al., "Location and Navigation Support for Emergency Responders: A Survey," IEEE CS, pp. 38-47, 2010.
Henke, "The Table Metaphor: A Representation of a Class and Its Instances," pp. 93-98, prior to Dec. 23, 2009.
Honeywell, "Excel Building Supervisor—Integrated R7044 and FS90 Ver. 2.0," Operator Manual, 70 pages, Apr. 1995.
Honeywell, "Precision Indoor Personnel Location and Tracking for Emergency Responders," 20 pages, Aug. 3-4, 2009.
http://kpogre.sourceforge.net/tutorial03/index.html, "Create Tabe Using Wizard," 8 pages, printed Oct. 18, 2009.
http://uic.edu/depts/accc/seminars/access2000-intro/tables.html, "Creating Tables with the Table Wizard-Access 2000 Introduction," 3 pages, Oct. 18, 2009.
http://www.firerescue1.com/print.asp?act=print&vid=405845, "3-D Locator Featured at Washington Tech. Demonstration," 3 pages, Jun. 20, 2008.
Johnston et al., "Estimating Building Floor-Plans From Exterior Using Laser Scanners," SPIE IS&T vol. 6805, 11 pages, 2008.
Kumar et al., "Robot and Sensor Networks for First Responders," IEEE CS and IEEE ComSoc, pp. 24-33, Oct.-Dec. 2004.
Le et al., "Ultrawideband (UWB) Radar Imaging of Building Interior: Measurements and Predictions," IEEE Transactions on Geoscience and Remote Sensing, vol. 47, No. 5, pp. 1409-1420, May 2009.
Rashidi, "Smart Home Adaptation Based on Explicit and Implicit User Feedback," 166 pages, Dec. 2007.
Rau et al., "Geometrical Building Modeling and its Application to the Ortho-Rectification for Aerial Images," Journal of Photogrammetry and Remote Sensing, vol. 9, No. 1, pp. 53-76, Mar. 2004.
Sacks et al., "A Project Model for an Automated Building System: Design and Planning Phases," Automation in Construction, vol. 7, pp. 21-34, 1997.
Snavely et al., "Modeling the World from Internet Photo Collections," International Journal of Computer Vision, vol. 80, Issue 2, pp. 189-210, 2008.
Trane, "System Programming, Tracer Summit Version 14, BMTW-SVP01D-EN," 623 pages, 2002. (This reference will be uploaded in 3 parts).
Wang et al., "Camera Localization and Building Reconstruction from Single Monocular Images," 8 pages, 2008.
www.automatedbuildings.com/news/may10/articles/lavelleenergy/100427104606lavelle.htm, "Virtual Building Energy Management Moving to Cloud-based Building Energy Management," 7 pages, May 2010.
Davies et al., "Scalable, Distributed, Real-Time Map Generation", IEEE, Intelligent Transport Systems, p. 47-54, 2006.
Engineering Acoustics, Inc., "Tactor Interface/Controller Advanced Evaluation Board Eval. 2.0", 2 pages, prior to Apr. 30, 2010.
http://www.sara.com/ISR/low_frequency_EM/magnetic_communication.html, "Magnetic Communications", 2 pages, Jun. 27, 2011.
Matsumoto, "Real-Time Multi-Sensor Localisation and Mapping Algorithms for Mobile Robots", 309 pages, 2009.
Walker et al., "Development and Evaluation of a System for Wearable Audio Navigation", Proceedings of the Human Factors and Ergonomics Society 49th Annual Meeting, p. 1607-1609, 2005.
Yagi et al., "Real-Time Generation of Environmental Map and Obstacle Avoidance Using Omnidirectional Image Sensor with Conic Mirror", IEEE, p. 160-165, 1991.

\* cited by examiner

SYSTEMS AND METHODS FOR PRESENTING BUILDING INFORMATION

The present application claims priority to Australian Patent Application No. AU2011902571, filed Jun. 29, 2011, which is incorporated herein by reference.

FIELD OF THE INVENTION

The present invention relates to systems and methods for presenting building information. Embodiments of the invention have been particularly developed for a Building Management System (BMS) thereby to assist technicians in physically locating pieces of equipment in a building, in some cases via the use of portable devices. While some embodiments will be described herein with particular reference to that application, it will be appreciated that the invention is not limited to such a field of use, and is applicable in broader contexts.

BACKGROUND

Any discussion of the background art throughout the specification should in no way be considered as an admission that such art is widely known or forms part of common general knowledge in the field.

Building management systems (BMS) are used to assist in the control, monitoring and management of a large number of pieces of equipment in a building. These commonly include the likes of HVAC equipment and surveillance equipment.

Technicians are regularly required to physically interact with pieces of equipment, for example due to an alert raised in the BMS. However, it is often a difficult task for the technician to physically locate the equipment. Even in a BMS that implements a sophisticated approach for recording the location of pieces of equipment and displaying that information on a central computer, a remote technician faces significant challenges. For example, floor plans can be difficult to read and/or access remotely, and equipment may be concealed behind walls and the like.

There is a need in the art for improved systems and methods for presenting building information.

SUMMARY

It is an object of the present invention to overcome or ameliorate at least one of the disadvantages of the prior art, or to provide a useful alternative.

One embodiment provides a computer-implemented method for presenting building information, the method including the steps of:

maintaining access to data indicative of building schematics;

maintaining access to data indicative of the position of a plurality of pieces of equipment relative to the building schematics;

receiving data indicative of the position of a portable device;

providing via the portable device data indicative of the location of one or more pieces of equipment relative to the position of the portable device.

One embodiment provides a method for defining an augmented reality image, the method including:

receiving data indicative of an image captured at an image capture device, the image including an internal region of a building;

comparing the image with 2D virtual images representative of internal regions of the building, the 2D images being constructed from BIM data;

matching the captured image with a 2D virtual image, thereby to identify in the BIM data the region of the building captured;

overlaying on the captured image data indicative of the location of at least one piece of equipment defined in the BIM data.

One embodiment provides a computer program product for performing a method as described herein.

One embodiment provides a non-transitive carrier medium for carrying computer executable code that, when executed on a processor, causes the processor to perform a method as described herein.

One embodiment provides a system configured for performing a method as described herein.

Reference throughout this specification to "one embodiment", "some embodiments" or "an embodiment" means that a particular feature, structure or characteristic described in connection with the embodiment is included in at least one embodiment of the present invention. Thus, appearances of the phrases "in one embodiment", "in some embodiments" or "in an embodiment" in various places throughout this specification are not necessarily all referring to the same embodiment, but may. Furthermore, the particular features, structures or characteristics may be combined in any suitable manner, as would be apparent to one of ordinary skill in the art from this disclosure, in one or more embodiments.

As used herein, unless otherwise specified the use of the ordinal adjectives "first", "second", "third", etc., to describe a common object, merely indicate that different instances of like objects are being referred to, and are not intended to imply that the objects so described must be in a given sequence, either temporally, spatially, in ranking, or in any other manner.

In the claims below and the description herein, any one of the terms comprising, comprised of or which comprises is an open term that means including at least the elements/features that follow, but not excluding others. Thus, the term comprising, when used in the claims, should not be interpreted as being limitative to the means or elements or steps listed thereafter. For example, the scope of the expression a device comprising A and B should not be limited to devices consisting only of elements A and B. Any one of the terms including or which includes or that includes as used herein is also an open term that also means including at least the elements/features that follow the term, but not excluding others. Thus, including is synonymous with and means comprising.

BRIEF DESCRIPTION OF THE DRAWINGS

Embodiments of the invention will now be described, by way of example only, with reference to the accompanying drawings in which.

DESCRIPTION

Described herein are systems and methods for presenting building information. In overview, the technologies described herein provide relationships between Building Information Modeling (BIM) data (which includes building schematics defined in terms of standardized three dimensional models) and Building Management System (BMS) data (which includes data indicative of the operation of building components such as HVAC components and the like). Some embodiments use relationships between these forms of data thereby to assist technicians in identifying the physical location of particular pieces of equipment, for example in the context of performing inspections and/or maintenance. In some cases this includes the provision of 2D and/or 3D maps to portable devices, these maps including the location of equipment defined both in BIM and BMS data. In some cases, augmented reality technology is applied thereby to provide richer access to positional information.

General Overview

Figure 1:
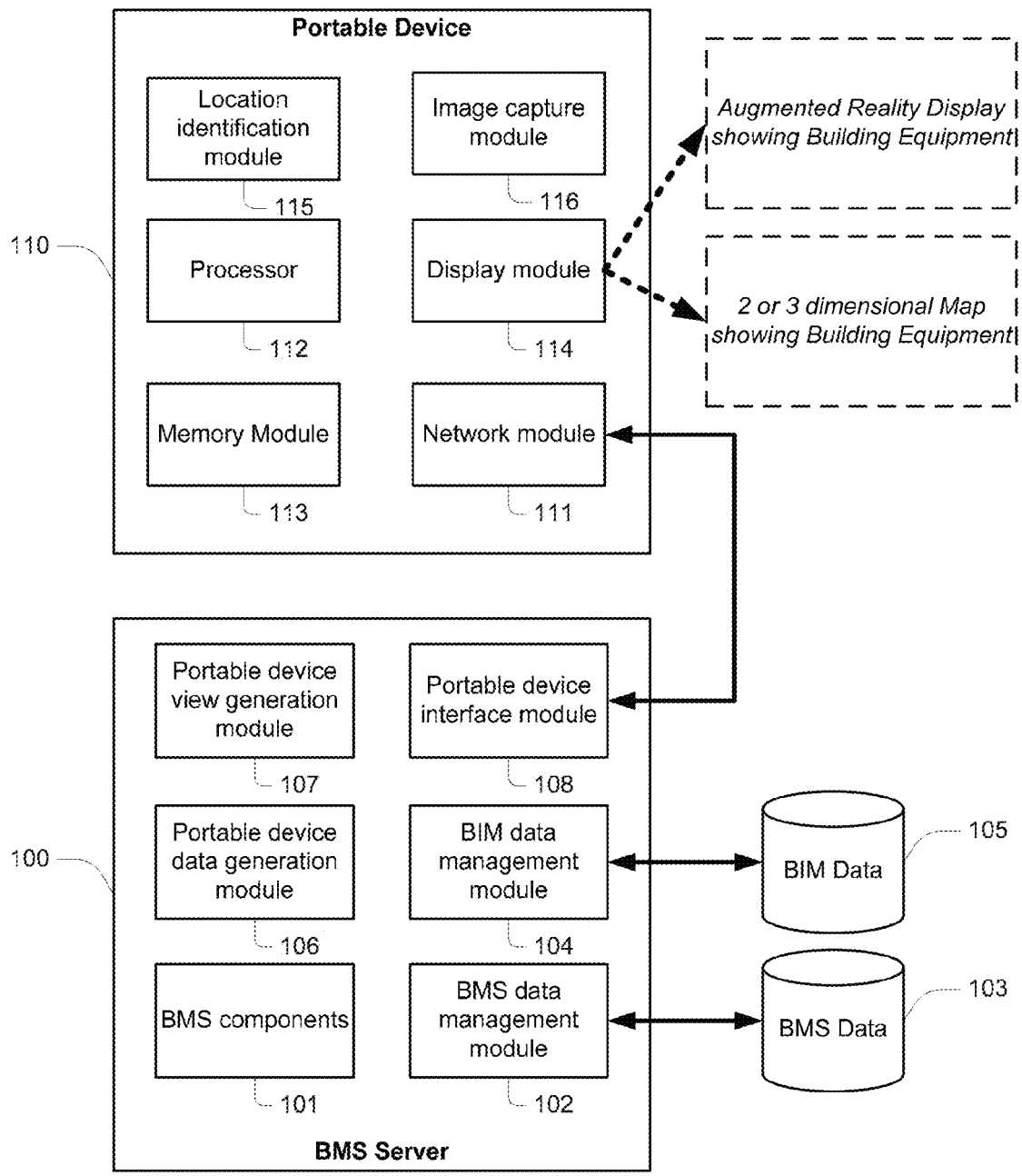
FIG. 1 schematically illustrates a system according to one embodiment.

FIG. 1 illustrates a framework according to one embodiment. It should be appreciated that modules/components illustrated in this figure are functionally defined, and may be defined in other embodiments across multiple hardware components. That is, for example, server 100 may be defined by a plurality of servers and/or other networked terminals.

A BMS server 100 includes BMS components 101. These represent general components implemented by a BMS server thereby to provide building management functionalities. BMS components 101 operate in conjunction with a BMS data management module 102, which accesses a BMS database 103. Collectively, these components provide general BMS functionalities for a building, such as monitoring, alarms, and so on.

Server 100 additionally includes a Building Information Modeling (BIM) data management module 104, which operates in conjunction with a BIM database 105. This database includes objects that allow a building and its equipment to be represented via electronic maps, including either or both of 2D and/or 3D maps (the term "map" being used herein in the geographical context—a "map" provides location information in a graphical manner). As context, BIM includes technology for representing a building as objects that carry their geometry, relations and attributes.

A portable device data generation module 106 is configured for defining data to be displayed at a portable device 110. This data includes alarms, jobs, equipment lists, monitored values, and the like that are provided by BMS components 101. A portable device view generation module is configured for defining data to be displayed at a portable device 110, this being data for assisting in the physical locating of equipment (such as 2D or 3D maps, augmented reality information, and so on). In this manner, modules 106 and 107 leverage data from databases 103 and 105 thereby to provide to a user of device 110 a combination of BIM data and BMS data. This allows a user of device 110 to physically locate equipment, navigate between pending jobs, and/or other such activities.

A portable device interface module 108 is configured to handle the movement of data between server 100 and device 110. For example, this module receives data and/or requests from device 110, and passes those to modules 106 and 107 for handling. Also, module 108 pushes data from modules 106 and 107 to device 110 as required. In some embodiments module 108 provides for a web server arrangement thereby to facilitate communication between server 100 and a plurality of devices 110.

Portable device 110, in the case of FIG. 1, represents a fairly generic portable device from a hardware perspective. For instance, it will be appreciated that device 100 may be an iPad, smartphone, netbook, notebook, PDA, tablet, or other device having the requisite hardware components. In some cases configuring a device for operation with server 100 includes installing proprietary software on the device. In other cases this is not necessary, and an existing web browser application is used for the purposes of interaction with server 100. The term "portable" means that a device is configured to be carried around. In some cases the portable device is a handheld device (being a device configured to be operated whilst being held).

Device 110 includes a network module 111 (such as a GRPS, 3G, WiFi or other wireless networking module) which configures device 110 to communicate with server 100. In some cases there are a plurality of network modules (for example WiFi is used only when available, and 3G used otherwise). A microprocessor 112 is configured to execute software instructions stored on a memory module 113. These software instructions include software instructions native to the operation of device 110 and, in some embodiments, software instructions specific to the interaction between device 110 and server 100 (for example where that interaction requires the installation of proprietary software on device 100). A display module 114 (such as a LED or LCD screen, preferably being a touch screen) provides graphical information to a user. A location identification module 115 allows for device 110 to identify its location, preferably in three dimensions. This may include a GPS module, and/or other modules. In some cases the network module is leveraged, for example using WiFi or cellular-based triangulation techniques. In some cases a triangulation server and/or triangulation nodes are installed in a building facility thereby to assist in triangulation. An image capture module 116, such as a digital camera module, is preferably provided in a forward facing configuration (i.e. a camera facing away from the display). It will be appreciated that such a configuration is preferable for augmented reality applications. In some cases module 115 additionally or alternately leverages module 116. For example, images captured by module 116 are compares with data at server 100 thereby to establish the position of device 100 when the image was taken.

As illustrated in FIG. 1, interaction between device 110 and server 100 enables device 100 to provide via display 114 data indicative of the location of one or more pieces of equipment defined in BMS data 103 relative to the position of the portable device 110. In some embodiments this is achieved via a 2D or 3D map that indicates both the position of device 110 and the location of one or more process of equipment. In some embodiments augmented realty is used thereby to superimpose data indicative of the location of one or more pieces of equipment over image data captured by module 116. In some cases a user of device 110 is enabled to select either of these.

Figure 2A:
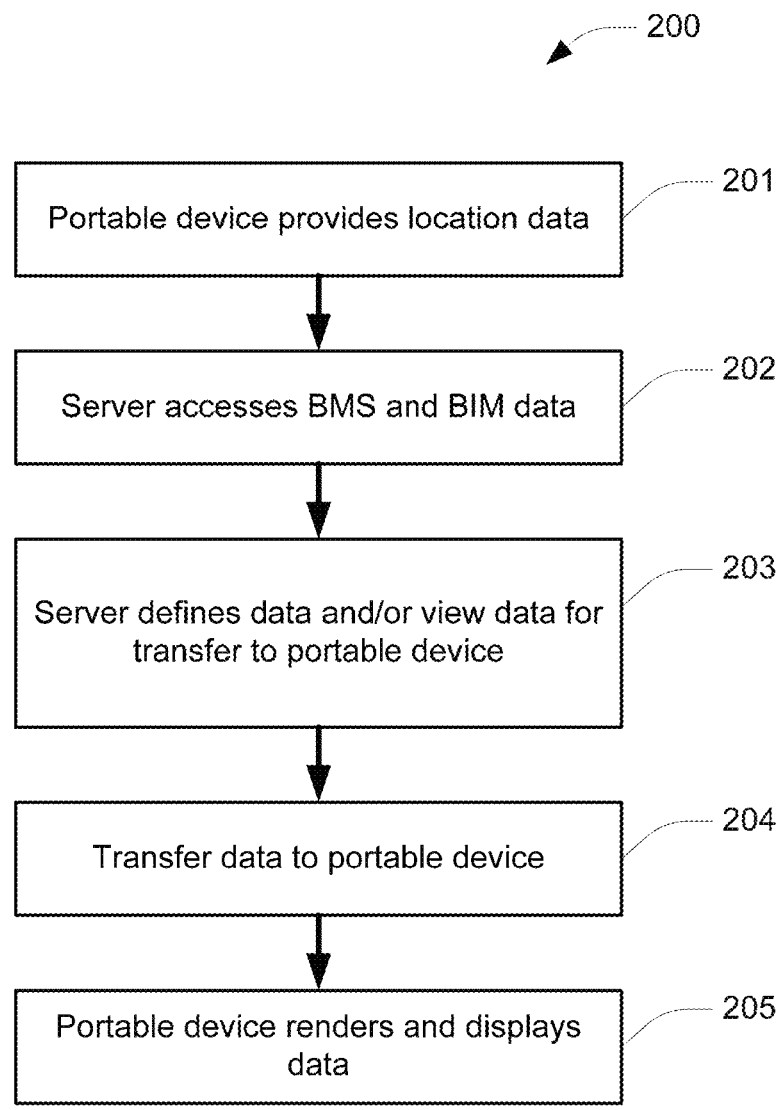
FIG. 2A illustrates a method according to one embodiment.

Whilst embodiments described further below provide more detailed explanation as to how maps and/or augmented reality displays are provided, FIG. 2A provides a method 200 according to one embodiment defined at a relatively high level. It will be appreciated that some steps of this method are preformed on the basis of software instructions executing at server 100, and other steps on the basis of software instructions executing at device 110. It will additionally be appreciated that this general method is modified to provide particular functionalities.

Step 201 includes device 110 providing location data to server 100. This may be indicative of the location of device 110 an/or indicative of information collected by device 110 to enable server 100 to determine the location of device 110 relative to a set of 3D coordinates. BIM data uses a corresponding set of 3D coordinates. Accordingly, at step 202, server 200 accesses BIM data thereby to determine the location of device 110, and BMS data thereby to identify information relevant to equipment proximal device 110. For example, this may include identifying a piece of equipment proximal device 110 for which an error or maintenance request has been recorded in the BMS data.

Step 203 includes the server defining data and/or view data for transmission to device 110. In this sense, "data" is generically used to describe data that is not used to generate maps and/or augmented reality displays (such as details of proximal pending maintenance requests). This data is transmitted to device 110 at 204, and rendered at 205.

Exemplary Embodiments: Job/Equipment Directions

In the building services and security services market, it is known to implement Distributed Control Solution (DCS) via BMS on a large site. This includes HVAC and security equipment controlled through an integrated solution. A large site may consist of many buildings over a large area with many hundreds of pieces of controllable equipment and can have hundreds of facility maintenance staff employed to service the equipment and respond to occupant requests. The facility maintenance staff may respond to thousands of occupant requests and perform thousands of routine maintenance operations over a month. For these thousands of work orders, a common and sometimes time consuming task for the facility maintenance personnel is to locate a particular piece of equipment within the facility.

In some prior art implementations, the facility maintenance staff in the central facility management office will combine information from the Distributed Control Solution and engineering drawings or a Building Information Model to identify the building, floor and room location at which this equipment exists and the relationship to other pieces of equipment. This information will be provided to the dispatched service engineer in the form of a textual based work order. The service engineer will navigate to the required building. Once they have reached the require floor and room the HVAC equipment is typically installed behind false ceilings on the roof out of sight of the occupants so the service engineer may have to lift various roof tiles to locate the specific equipment.

Embodiments of the framework of FIG. 1 are used in some embodiments to provide the location of a given piece of equipment and related information to a dispatched service engineer (carrying a device 110) in richer and more intuitive forms which will allow them to find the piece of equipment more rapidly.

Figure 3:
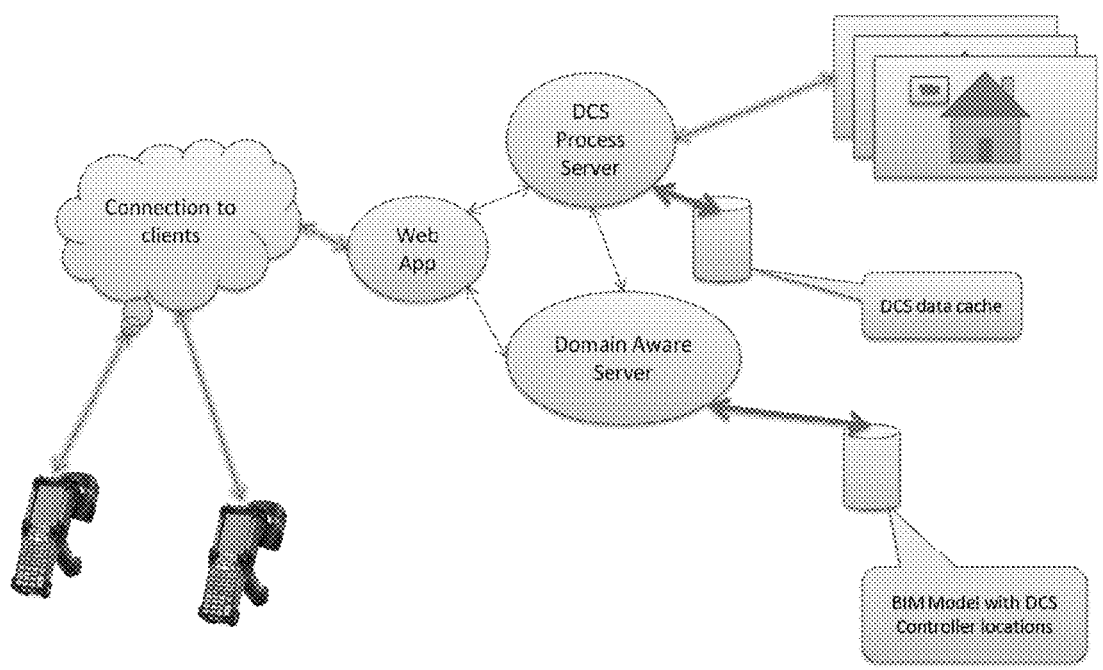
FIG. 3 illustrates a system according to one embodiment.

FIG. 3 illustrates an exemplary architecture according to one embodiment. Each connection over the open networks is highlighted to indicate security protocols are in place. A domain aware server is configured for providing information about equipment at a location and fetching a BIM model spatial data set for that location, which is used to render map graphics at a portable device. A web app provides a presentation layer that communicates with the domain aware server and a DCS server to display appropriate logic.

In this embodiment devices handheld are equipped with barcode scanners or MICR text recognition software and scanners, thereby to allow device self-location by scanning an identifier at a location (such as the entrance to a room. However, other technologies (such as GPS and/or other triangulation as discussed above) may be present.

Figure 2B:
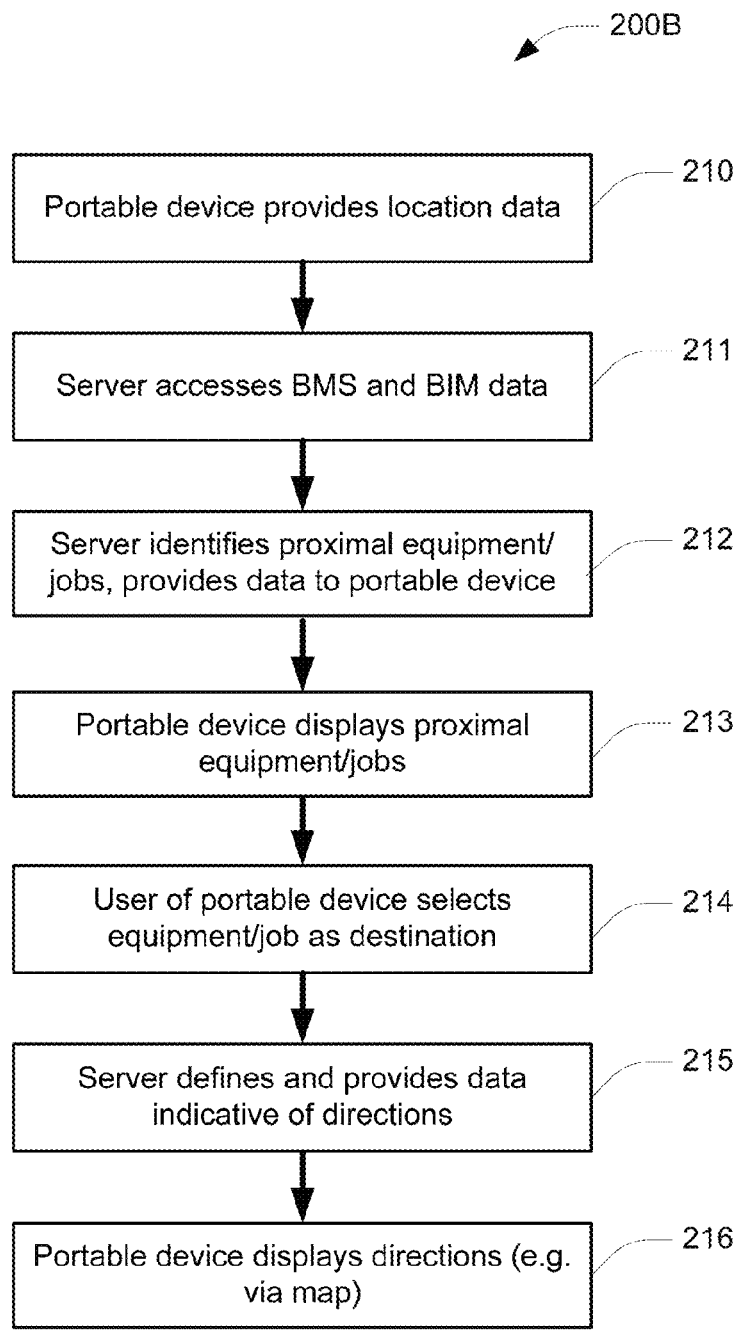
FIG. 2B illustrates a method according to one embodiment.

FIG. 2B illustrates an exemplary method 200B based on the example of FIG. 3. This method is relevant to a situation where a technician carries a device such as device 110. Step 210 includes device 110 providing location information (e.g. via barcode scanning or triangulation methods). This data is processed at the server at 211 and 212 thereby to identify BMS and BIM data relevant to the location of device 110. Step 212 includes transmitting to the mobile device data indicative of proximal jobs and/or equipment. This data is displayed at the device at 213, and user of device selects a job or a piece of equipment from the display at 214. The server then defines and provides data indicative of directions from the current location of device 110 to the identified job or piece of equipment at 215. This data is rendered at 216, thereby to display to the user of device 110 a map and/or other directions from the current location to the location of the selected job/piece of equipment. The nature of directions may vary depending on proximity to the job/piece of equipment (e.g. more precise is already in the correct room of a building).

Remote Point Modification

In some embodiments, device 110 is configured to enable an operator having appropriate permissions to modify parameters for one or more points defined in BMS data 103. For example, a technician uses device 110 to locate a piece of equipment, performs maintenance, and selects the piece of equipment on the display of device 110, and is presented with an interface for modifying parameters of the point in BMS data 103 associated with that piece of equipment.

BMS data 103 defines the relationship between the point parameters configured in the system. When the operator tries to change any parameter which is associated to other parameters, the operators is made aware of the consequences of the changes and this will help to avoid any false alarms being generated in the buildings.

Multi-Layer Views

Using location aware functionalities for maintenance, the server is configured to identify the area which needs to be rendered to the operator. Accordingly, any BMS point parameters configured for that area could only be requested to the server. The server by storing the location tag for the points configured in it, only the points fall under the requested area will be sent to device 110. This assists in reducing the time taken for the BMS server to respond with the values back to portable devices, such that displays are able to be updated promptly, and also effects advantages are realized in terms of reducing unnecessary traffic in the building network infrastructure.

The point parameters built on the BMS server are in some embodiments given device display levels, thereby to filter out necessary points only during the zoomed views. Say for example, if the operator is in "AHU Level view" (being a view level at which Air Handling Units and other such level of HVAC equipment is displayed), device points that are applicable only in the AHU Level will be displayed. If the user wishes to go into depth (by zooming in on a displayed map at an area corresponding to a piece of equipment, devices in the next level (controller) are displayed. Even further, the control loop level details and then field device points are displayed.

As the technician moves, floor plan displayed on device 110 also moves, and during this time, the viewing station makes request to the server 100 thereby to display the point parameters and alarms if any in the floor plan area. Looking at the alarms, the technician can identify the faulty points. On an as-needed basis, the technician can go in deep on the floor plan display levels and update the points. While updating the points, technician will also notified any impacts of point changes through established point relationship model. Any changes made in the building system are verified through the floor plan, which received real time information from the field devices and the BMS. The technician then returns to the control room and closes the call/ticket.

In some embodiments a device 110 determines its location (which may include requesting location coordinates from a location server) periodically. Device 110 then requests graphic details for a map (e.g. floor plan) from server 100, which are obtained from BIM data 105. Data for rendering a relevant map is then transmitted by server 100 to device 110. Device 110 then requests the list of points to be displayed in conjunction with the map graphics based on the current display level. Server 100 responds with values for parameters associated with the points requested.

Augmented Reality—Static Images

It will be appreciated that many pieces of equipment in a building, such as HVAC system components, the fire life safety network, the lighting control panel contents, and so on, are hidden behind a floor or a wall. Some embodiments of the technology discussed herein use augmented technology to assist in overcoming this problem. For example, BIM and/or BMS data is used to overlay information on a digitally captured image thereby to assist in locating hidden equipment.

One embodiment overlays hidden objects and semantic information over a digitally captured image (taken using device 110) from the user's perspective to augment his/her perception of reality. Firstly, a building floorplan (and/or other mapping information) is input into the system and BIM data is correspondingly generated or directly input from the BIM model. The hidden and semantic information are assumed to relate to equipment some installed control network (e.g. in BMS data 103), for example in the context of an HVAC control network, fire life safety network, etc. All control networks are registered in the BIM data. An augmented reality image generation system makes use of a BIM model to find the relationships of digital image captured by device 110 and semantic information, allowing the display of a composite augmented image to supply the user a comprehensive display of the field environment in the user's context.

One embodiment includes defining an augmented reality image. This is achieved by firstly receiving data indicative of an image captured at an image capture device (in this case being device 110), the image including an internal region of a building. This image is compared at server 100 with 2D virtual images representative of internal regions of the building constructed from BIM data. The captured image is matched with a 2D virtual image, thereby to identify in the BIM data the region of the building captured. Then, the captured image is overlaid with data indicative of the location of at least one piece of equipment defined in the BIM data. For example, the location of a piece of HVAC equipment hidden behind a wall is revealed by overlaying data on the captured image, and presenting that to a user of device 110.

Figure 4:
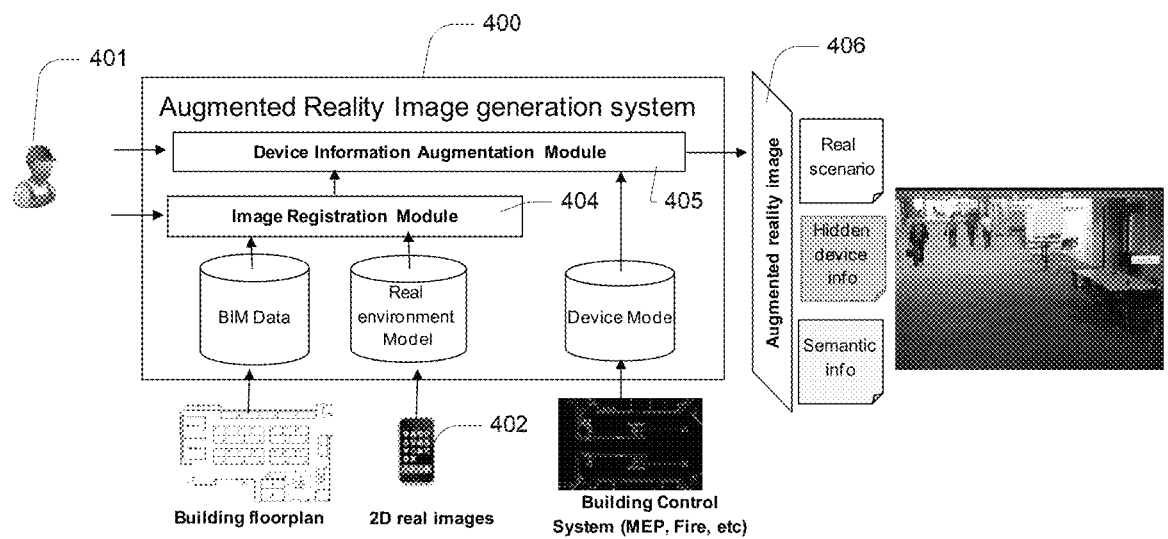
FIG. 4 illustrates a system according to one embodiment.

FIG. 4 illustrates an augmented realty image generation system 400 according to one embodiment. A user 401 captures field real image using device 402 (which may be a device 110). The image can be either a Region of Interest (ROI) or a panorama image. To find the relationship between real image and semantic device plan image is challenging, the following steps are used:

An image registration module 404 is used to determine a relationship between a 3D building model from BIM data and real environment. The image registration module generates a 2D virtual image from the BIM data, thereby to allow attempted matching of a 2D virtual image with another 2D image (from device 402). This may be assisted using portable device triangulation or the like, as discussed above, thereby to reduce the scope of images that need to be compared.

A device information augmentation module 405 to overlay the device data to the BIM model according to the corresponding semantic information existing both in BIM model and the device data plan image (i.e. BMS data). Then, using the image parameters determined by registration module 404, the device data is projected to a 2D space consistent with the captured digital image view.

Based on the projection, the device data is overlaid on the captured digital image, which is hence configured as an augmented image 406 which shows a real scenario and hidden device information (e.g. location), and optionally semantic information.

In some embodiments cameras of an existing surveillance system are used, these cameras having known locations, thereby to generate a library of augmented images for various locations in a building. These are optionally stitched into panoramic views by predetermined PTZ control and image capture using the existing surveillance cameras, so that a room requires only a single or small number of images to display all walls. In such embodiment, augmented reality images are optionally displayed on a central computer, as opposed to a portable device.

Augmented Reality—Dynamic Application

Figure 5:
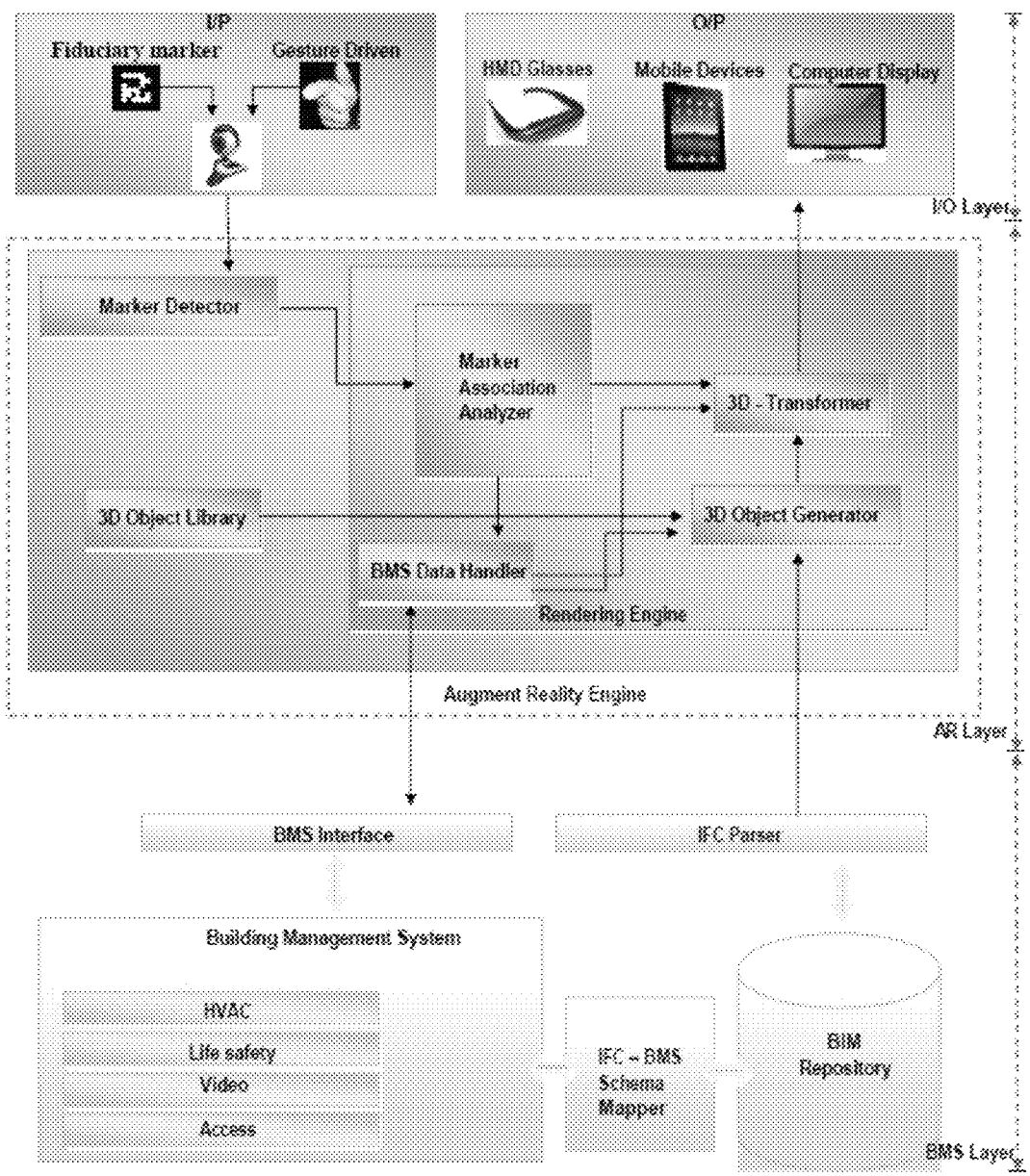
FIG. 5 illustrates a system according to one embodiment.
Figure 6:
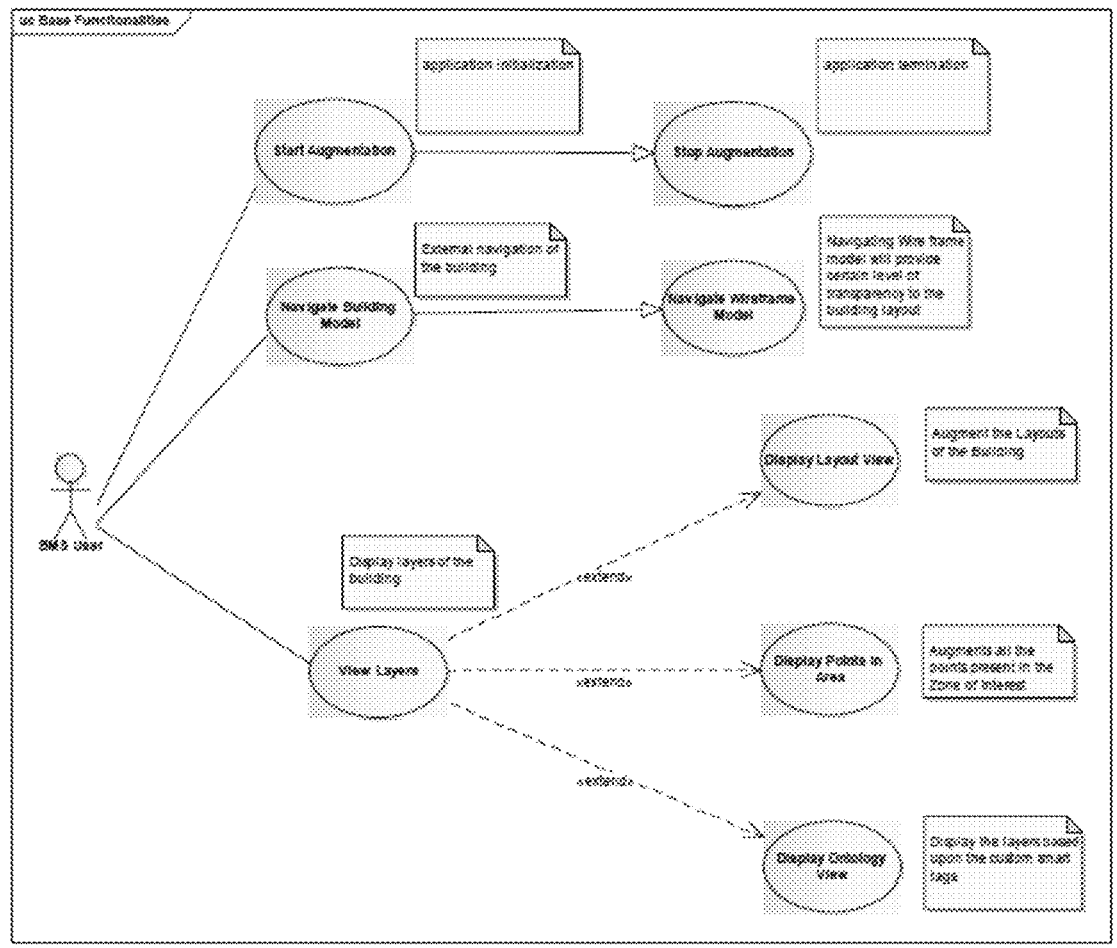
FIG. 6 illustrates an augmented reality use case according to one embodiment.
Figure 7:
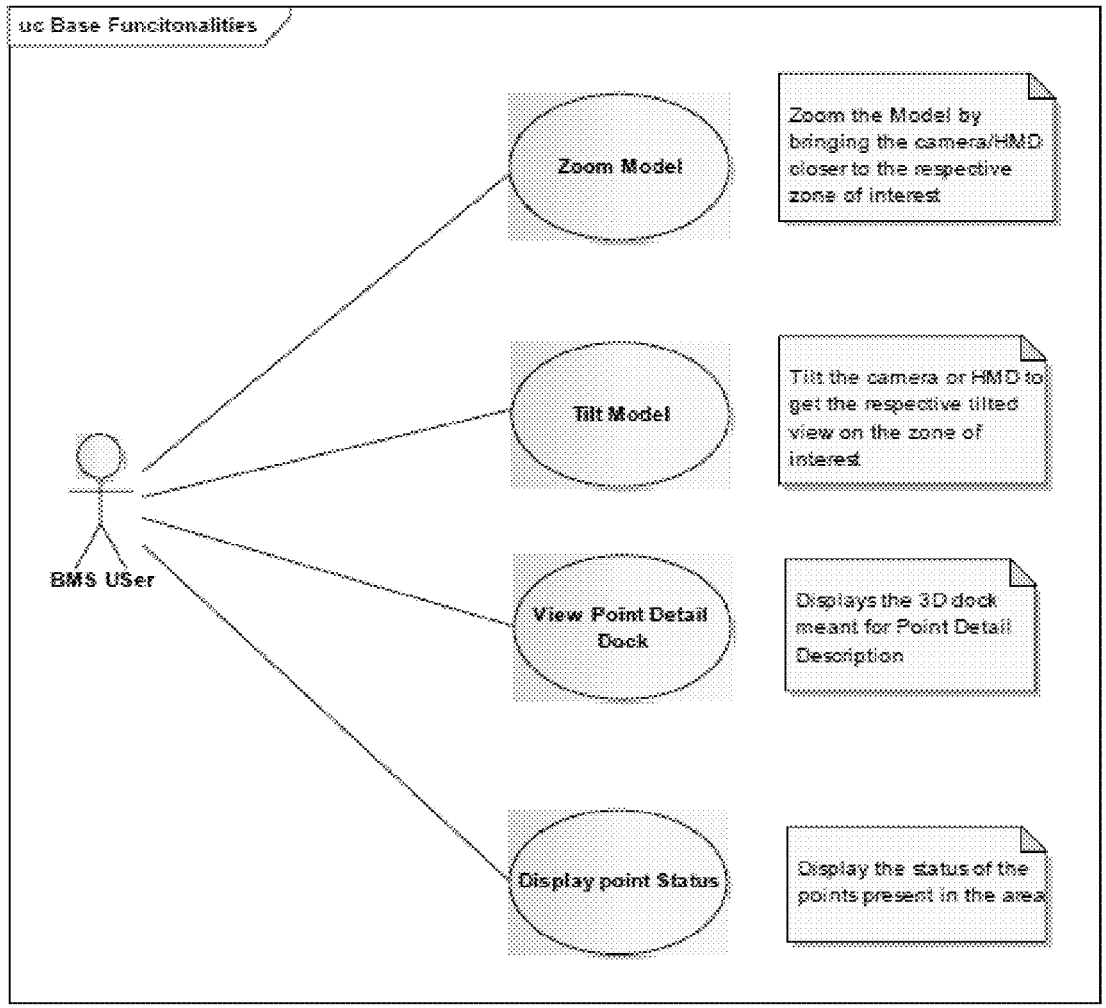
FIG. 7 illustrates an augmented reality use case according to one embodiment.
Figure 8:
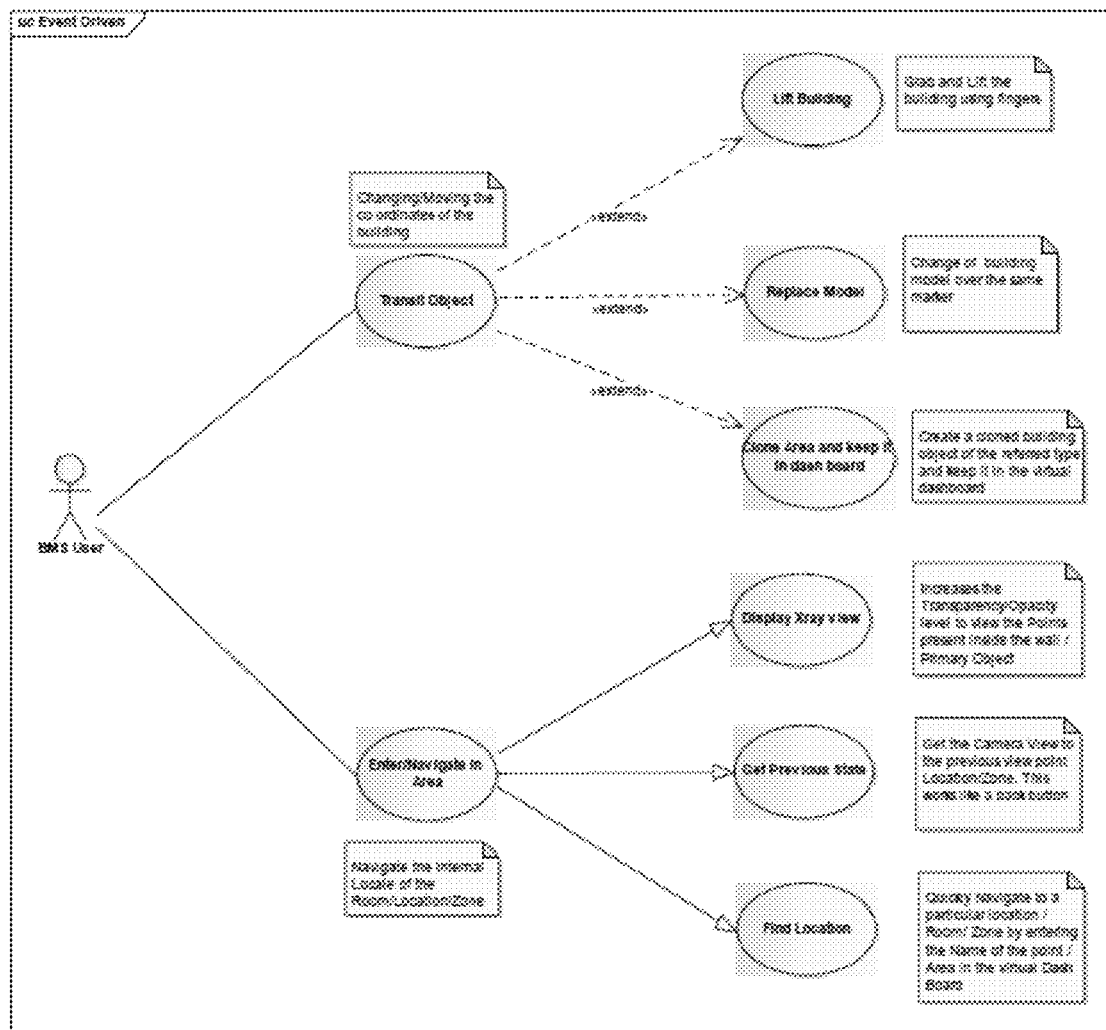
FIG. 8 illustrates an augmented reality use case according to one embodiment.
Figure 9:
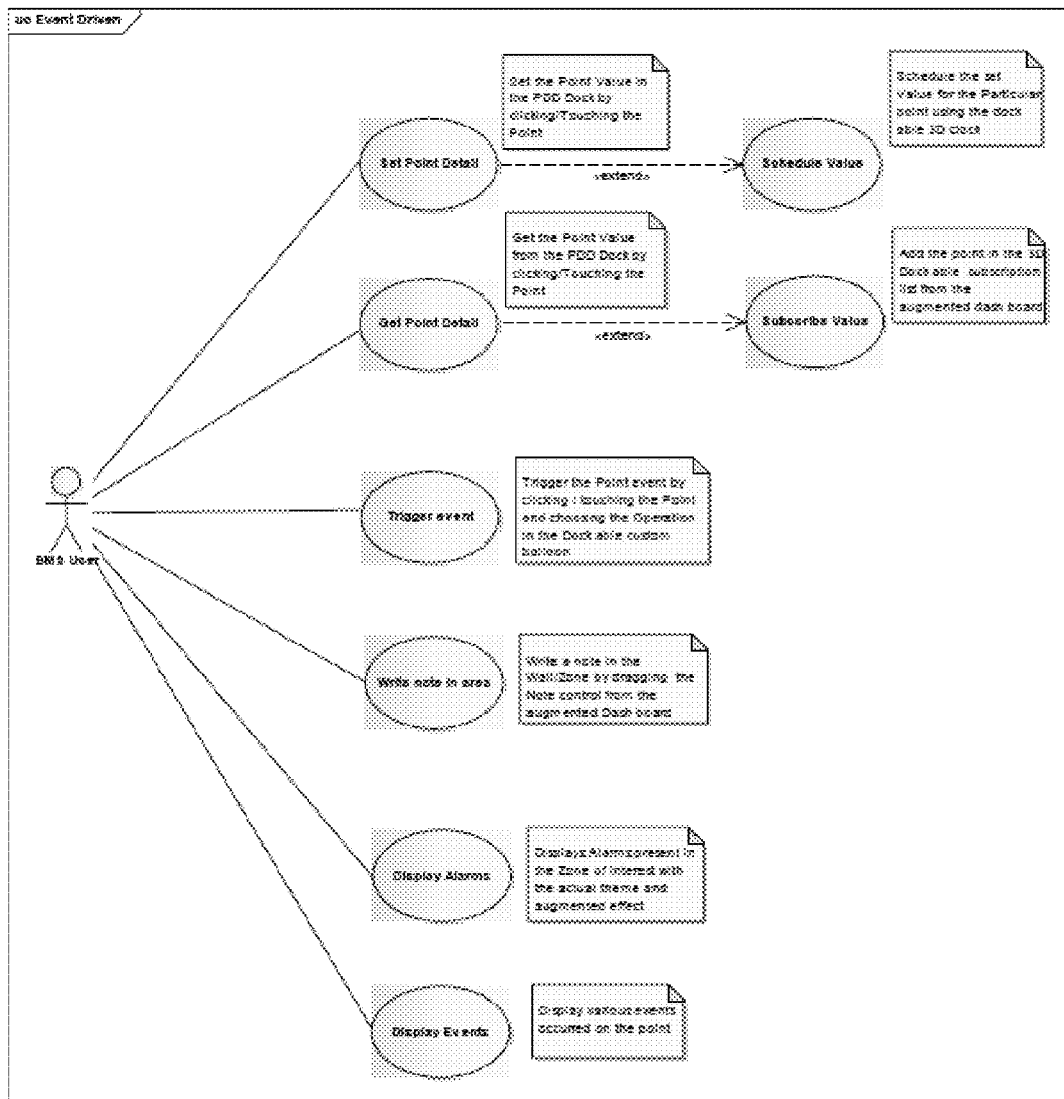
FIG. 9 illustrates an augmented reality use case according to one embodiment.

Exemplary architecture for a further augmented reality embodiment is shown in FIG. 5. This embodiment may use a convectional portable device such as device 110. However, in the described examples, device 110 is replaced by a set of head mounted video glasses as a visual display unit for the user, through which he/she can visualize live video along with augmented 3D objects, and a gesture driven trigger device which allows a user to "click" on an augmented 3D object displayed by the head mounted video glasses.

At the IO layer, a fiduciary marker is used by an augmented reality runtime engine to find the real world coordinates of the camera and to map the augmented object with respect to that. This could be a single marker or multiple markers. For example, patterned markers are mounted to walls and the like, thereby to allow positional identification of a camera. Gesture driven markers are mounted to the hands/fingers of the user to identify various gestures and dimensions in order to manipulate the user action within the augmented environment for triggering custom events. A camera serves as the primary input device, and bridges the co ordinates of the markers, live video, and hand mounted markers for the purpose of event driving.

Head mounted video glasses are be used as a visual display unit for the user through which he could visualize the video stream of live video from the camera, along with augmented 3D objects. The images are in some cases additionally/alternately rendered onto portable devices (such as device 110) and/or computer displays.

At the augmented reality layer, a marker detector module is configured to identify the real time camera position, inclination, orientation relative to physical markers in real time and marker tracking routines, calibration and parameter collection. This module is having the extra functionality of identifying the marker as well. The marker detector module communicates with a tracking library thereby to assist in real time camera position/orientation tracking and real time tracking of marker codes. The marker detector module provides high level integration of video input (video object, shades), spatial registration (marker-based, multiple trackers), and photometric registration (occlusion, shadow).

A marker association analyzer module receives data from the marker detector, including the details related to the camera such as real time camera position, inclination, distance and the orientation. The marker association analyzer module uses these values and converts them to rendering engine understandable format and fed into 3D-Transformer. Based upon the dimensions of the markers, respective event/action commands are provided to a 3D transformer.

A 3D-object library contains a predefined set of 3D objects which are used at runtime by the 3D object generator for creating the 3D view of received BIM data. A BMS data handler takes converted data from the BIM Interface, and performs data validation, tagging the data with respect to BIM facility model and prioritizing the data. The tagging method assists in uniquely identifying the data with respect to the 3D-model. Then the set of data is provided to the 3D-transformer.

A 3D-object generator correlates BIM data with 3D models present in the 3D-object library and make it a complete 3D-model that can be further processed by the 3D-transformer.

The 3D-transformer is configured for creating real-time augmented reality which overlays 3D virtual objects on real markers. It takes the real-time camera details fed through control handler, binary form of real time marker orientation from marker handler and the 3D-image from the 3D-object generator and use the matrix transform and nodal methods to render the image and fed it to output devices. With respect to the position of the camera computer graphics model is drawn from that same position. This model is drawn on top of the video of the real world and so appears "stuck" on the square marker. During rendering operation the data from BIM data handler is also added into the rendered image according to tag name present in the data portion. Unique data association with respect to 3D model is performed using the tagging property added to the data by the BIM data handler.

At the BMS layer, a BIM repository contains information about the building model. Thse use a common format that defines the parts of a structure/building as objects, which have an X-Y-Z geometry location, specific material, loads expected, and a host of other information. All of this information is shown in a 3D graphic presentation, with layers that pertain to different disciplines making up the final BIM model. There is a layer for each part of the structure: CAD design, structural analysis, detailing, HVAC, plumbing, electrical, interior finishes, and as many others as the property developer/owner decides he wants to have in his finished BIM.

An IFC-BMS Schema Mapper component maps the Schema definitions between an IFC data format and BMS application data format. For example, in the BIM repository a chiller will be present as an independent entity, whereas in the BMS system it will be stored as a piece of equipment with associated sensor points.

A Building Management System (BMS) operates in conjunction with a BMS interface module. This provides real time BMS data into the augmented reality engine module. It converts the BMS data into an augmented reality engine compatible format. This module play key role in providing the real time BMS information into the augment reality world.

An IFC parser is configured to parse the building information from BIM repository. It parses all the information and it will convert them into the augmented reality compatibly format, parsing information about building plans, floor plans, and controller location information. It then generates the complete layout of building in a 3D format which is compatible to the augmented reality engine.

FIG. 6 to FIG. 9 illustrate exemplary use cases for the above augmented reality embodiment.

CONCLUSIONS AND INTERPRETATION

It will be appreciated that the disclosure above provides various significant systems and methods for presenting building information.

Unless specifically stated otherwise, as apparent from the following discussions, it is appreciated that throughout the specification discussions utilizing terms such as "processing," "computing," "calculating," "determining", analyzing" or the like, refer to the action and/or processes of a computer or computing system, or similar electronic computing device, that manipulate and/or transform data represented as physical, such as electronic, quantities into other data similarly represented as physical quantities.

In a similar manner, the term "processor" may refer to any device or portion of a device that processes electronic data, e.g., from registers and/or memory to transform that electronic data into other electronic data that, e.g., may be stored in registers and/or memory. A "computer" or a "computing machine" or a "computing platform" may include one or more processors.

The methodologies described herein are, in one embodiment, performable by one or more processors that accept computer-readable (also called machine-readable) code containing a set of instructions that when executed by one or more of the processors carry out at least one of the methods described herein. Any processor capable of executing a set of instructions (sequential or otherwise) that specify actions to be taken are included. Thus, one example is a typical processing system that includes one or more processors. Each processor may include one or more of a CPU, a graphics processing unit, and a programmable DSP unit. The processing system further may include a memory subsystem including main RAM and/or a static RAM, and/or ROM. A bus subsystem may be included for communicating between the components. The processing system further may be a distributed processing system with processors coupled by a network. If the processing system requires a display, such a display may be included, e.g., a liquid crystal display (LCD) or a cathode ray tube (CRT) display. If manual data entry is required, the processing system also includes an input device such as one or more of an alphanumeric input unit such as a keyboard, a pointing control device such as a mouse, and so forth. The term memory unit as used herein, if clear from the context and unless explicitly stated otherwise, also encompasses a storage system such as a disk drive unit. The processing system in some configurations may include a sound output device, and a network interface device. The memory subsystem thus includes a computer-readable carrier medium that carries computer-readable code (e.g., software) including a set of instructions to cause performing, when executed by one or more processors, one of more of the methods described herein. Note that when the method includes several elements, e.g., several steps, no ordering of such elements is implied, unless specifically stated. The software may reside in the hard disk, or may also reside, completely or at least partially, within the RAM and/or within the processor during execution thereof by the computer system. Thus, the memory and the processor also constitute computer-readable carrier medium carrying computer-readable code.

Furthermore, a computer-readable carrier medium may form, or be included in a computer program product.

In alternative embodiments, the one or more processors operate as a standalone device or may be connected, e.g., networked to other processor(s), in a networked deployment, the one or more processors may operate in the capacity of a server or a user machine in server-user network environment, or as a peer machine in a peer-to-peer or distributed network environment. The one or more processors may form a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine.

Note that while diagrams only show a single processor and a single memory that carries the computer-readable code, those in the art will understand that many of the components described above are included, but not explicitly shown or described in order not to obscure the inventive aspect. For example, while only a single machine is illustrated, the term "machine" shall also be taken to include any collection of machines that individually or jointly execute a set (or multiple sets) of instructions to perform any one or more of the methodologies discussed herein.

Thus, one embodiment of each of the methods described herein is in the form of a computer-readable carrier medium carrying a set of instructions, e.g., a computer program that is for execution on one or more processors, e.g., one or more processors that are part of web server arrangement. Thus, as will be appreciated by those skilled in the art, embodiments of the present invention may be embodied as a method, an apparatus such as a special purpose apparatus, an apparatus such as a data processing system, or a computer-readable carrier medium, e.g., a computer program product. The computer-readable carrier medium carries computer readable code including a set of instructions that when executed on one or more processors cause the processor or processors to implement a method. Accordingly, aspects of the present invention may take the form of a method, an entirely hardware embodiment, an entirely software embodiment or an embodiment combining software and hardware aspects. Furthermore, the present invention may take the form of carrier medium (e.g., a computer program product on a computer-readable storage medium) carrying computer-readable program code embodied in the medium.

The software may further be transmitted or received over a network via a network interface device. While the carrier medium is shown in an exemplary embodiment to be a single medium, the term "carrier medium" should be taken to include a single medium or multiple media (e.g., a centralized or distributed database, and/or associated caches and servers) that store the one or more sets of instructions. The term "carrier medium" shall also be taken to include any medium that is capable of storing, encoding or carrying a set of instructions for execution by one or more of the processors and that cause the one or more processors to perform any one or more of the methodologies of the present invention. A carrier medium may take many forms, including but not limited to, non-volatile media, volatile media, and transmission media. Non-volatile media includes, for example, optical, magnetic disks, and magneto-optical disks. Volatile media includes dynamic memory, such as main memory. Transmission media includes coaxial cables, copper wire and fiber optics, including the wires that comprise a bus subsystem. Transmission media also may also take the form of acoustic or light waves, such as those generated during radio wave and infrared data communications. For example, the term "carrier medium" shall accordingly be taken to included, but not be limited to, solid-state memories, a computer product embodied in optical and magnetic media; a medium bearing a propagated signal detectable by at least one processor of one or more processors and representing a set of instructions that, when executed, implement a method; and a transmission medium in a network bearing a propagated signal detectable by at least one processor of the one or more processors and representing the set of instructions.

It will be understood that the steps of methods discussed are performed in one embodiment by an appropriate processor (or processors) of a processing (i.e., computer) system executing instructions (computer-readable code) stored in storage. It will also be understood that the invention is not limited to any particular implementation or programming technique and that the invention may be implemented using any appropriate techniques for implementing the functionality described herein. The invention is not limited to any particular programming language or operating system.

It should be appreciated that in the above description of exemplary embodiments of the invention, various features of the invention are sometimes grouped together in a single embodiment, FIG., or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the Detailed Description are hereby expressly incorporated into this Detailed Description, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those skilled in the art. For example, in the following claims, any of the claimed embodiments can be used in any combination.

Furthermore, some of the embodiments are described herein as a method or combination of elements of a method that can be implemented by a processor of a computer system or by other means of carrying out the function. Thus, a processor with the necessary instructions for carrying out such a method or element of a method forms a means for carrying out the method or element of a method. Furthermore, an element described herein of an apparatus embodiment is an example of a means for carrying out the function performed by the element for the purpose of carrying out the invention.

In the description provided herein, numerous specific details are set forth. However, it is understood that embodiments of the invention may be practiced without these specific details. In other instances, well-known methods, structures and techniques have not been shown in detail in order not to obscure an understanding of this description.

Similarly, it is to be noticed that the term coupled, when used in the claims, should not be interpreted as being limited to direct connections only. The terms "coupled" and "connected," along with their derivatives, may be used. It should be understood that these terms are not intended as synonyms for each other. Thus, the scope of the expression a device A coupled to a device B should not be limited to devices or systems wherein an output of device A is directly connected to an input of device B. It means that there exists a path between an output of A and an input of B which may be a path including other devices or means. "Coupled" may mean that two or more elements are either in direct physical or electrical contact, or that two or more elements are not in direct contact with each other but yet still co-operate or interact with each other.

Thus, while there has been described what are believed to be the preferred embodiments of the invention, those skilled in the art will recognize that other and further modifications may be made thereto without departing from the spirit of the invention, and it is intended to claim all such changes and modifications as falling within the scope of the invention. For example, any formulas given above are merely representative of procedures that may be used. Functionality may be added or deleted from the block diagrams and operations may be interchanged among functional blocks. Steps may be added or deleted to methods described within the scope of the present invention.

What is claimed is:

1. A method for delivering to a user of a portable device data representative of the location of a piece of hidden equipment, the method including:
  accessing a repository of Building Information Modeling (BIM) data for a building, the BIM data being representative of a 3D virtual model for the building;
  operating an image registration model thereby to generate a plurality of 2D virtual images of regions within the building, wherein the 2D virtual images are captured from virtual viewpoints;
  receiving data indicative of an image captured at an image capture device provided by the portable device, the captured image representative of a real life internal region of a building;
  comparing the captured image with the plurality of 2D virtual images defined by the image registration model;
  based on the comparing, identifying one of the 2D virtual images that corresponds to the captured image, in that the identified one of the 2D virtual images represents a virtual reconstruction from BIM data of the same internal region of the building captured by the capture image;
  operating a device information augmentation module thereby to overlay device data to the identified one of the 2D virtual images, wherein the device data includes a location of a piece of hidden equipment, being a piece of equipment is hidden from view behind a floor or a wall, and wherein the overlay identifies the location of the piece of hidden equipment relative to the identified one of the 2D virtual images;
  defining a projection of the identified one of the 2D virtual images, with the overlay identifying the location of the piece of hidden equipment, such that the projection is consistent in view point with the captured image; and
  based on the projection, applying the overlay identifying the location of the piece of hidden equipment to the captured image,
  thereby to assist a user of the portable device in locating hidden equipment that is not able to be visually located.

2. A method according to claim 1 including: receiving positioning information from the mobile device, wherein the positioning information is representative of the position of the mobile device when the captured image is captured; and processing the positioning information thereby define a subset of the 2D virtual images with which the captured image is compared.

3. A system for delivering to a user of a portable device data representative of the location of a piece of hidden equipment in a building, the system comprising:
  a memory for storing a repository of Building Information Modeling (BIM) data for a building, the BIM data being representative of a 3D virtual model for the building including hidden equipment;
  a controller coupled to the memory, the controller configured to:
    receive data indicative of an image captured at an image capture device provided by the portable device, the captured image representative of a real life internal region of a building;
    compare the captured image with a plurality of 2D virtual images of regions within the building, wherein the 2D virtual images are generated from the 3D virtual model of the building taken from virtual viewpoints;
    identify one of the 2D virtual images that corresponds to the viewpoint of the captured image, in that the identified one of the 2D virtual images represents a virtual reconstruction from BIM data of the same internal region of the building captured by the capture image;
    overlay a piece of hidden equipment on the identified one of the 2D virtual images;
    define a projection of the identified one of the 2D virtual images, with the overlay identifying the location of the piece of hidden equipment, such that the projection is consistent in view point with the captured image; and
    based on the projection, apply the overlay identifying the location of the piece of hidden equipment to the captured image, thereby to assist a user of the portable device in locating hidden equipment in the building.

* * * * *